(12) United States Patent
Ogino et al.

(10) Patent No.: US 6,791,513 B2
(45) Date of Patent: Sep. 14, 2004

(54) EXTENDING TYPE OF DISPLAY APPARATUS AND DISPLAY SYSTEM USING THE SAME

(75) Inventors: Osamu Ogino, Tokyo (JP); Takahiko Motoshima, Tokyo (JP); Shinsuke Nishida, Tokyo (JP)

(73) Assignees: Daichu Denshi Co., Ltd., Tokyo (JP); Fourie, Inc., Tokyo (JP)

( * ) Notice: Subject to any disclaimer, the term of this patent is extended or adjusted under 35 U.S.C. 154(b) by 0 days.

(21) Appl. No.: 10/383,680

(22) Filed: Mar. 10, 2003

(65) Prior Publication Data

US 2003/0146882 A1 Aug. 7, 2003

Related U.S. Application Data

(63) Continuation of application No. 09/086,492, filed on May 29, 1998, now Pat. No. 6,593,902.

(30) Foreign Application Priority Data

Jun. 2, 1997 (JP) ............................................. 9-144296

(51) Int. Cl.[7] .............................................. G09G 3/20
(52) U.S. Cl. ........................................ 345/55; 345/1.1
(58) Field of Search ............................ 345/55, 60, 1.1, 345/1.2, 204, 903, 211, 30, 33; 348/383

(56) References Cited

U.S. PATENT DOCUMENTS

| | | | |
|---|---|---|---|
| 4,723,119 A | | 2/1988 | Morimoto |
| 4,833,542 A | * | 5/1989 | Hara et al. .................. 348/383 |
| 4,901,155 A | * | 2/1990 | Hara et al. .................. 348/383 |
| 4,914,607 A | * | 4/1990 | Takanashi et al. .......... 345/790 |
| 4,980,774 A | | 12/1990 | Brody |
| 5,523,769 A | * | 6/1996 | Lauer et al. .................. 345/1.3 |
| 5,663,739 A | * | 9/1997 | Pommerenke et al. ....... 345/1.3 |
| 5,767,818 A | * | 6/1998 | Nishida ....................... 345/1.1 |
| 5,790,371 A | * | 8/1998 | Latocha et al. ............. 361/683 |
| 5,877,745 A | | 3/1999 | Beeteson et al. |
| 5,986,622 A | | 11/1999 | Ong |
| 6,097,351 A | * | 8/2000 | Nishida ....................... 345/1.3 |
| 6,150,996 A | * | 11/2000 | Nicholson et al. ........... 345/1.3 |
| 6,208,319 B1 | | 3/2001 | Nishida |
| 6,271,806 B1 | | 8/2001 | Motoshima et al. |
| 6,400,340 B1 | * | 6/2002 | Nishida ....................... 345/1.1 |
| 6,414,650 B1 | * | 7/2002 | Nicholson et al. ........... 345/1.1 |

FOREIGN PATENT DOCUMENTS

| | | |
|---|---|---|
| WO | WO65/10244 | 4/1996 |
| WO | WO97/36279 | 10/1997 |

\* cited by examiner

*Primary Examiner*—Richard Hjerpe
*Assistant Examiner*—Ronald Laneau
(74) *Attorney, Agent, or Firm*—Sughrue Mion, PLLC

(57) ABSTRACT

An extending type of display apparatus of which the screen can be extended by connecting a plurality of display units each having the same configuration to each other, in which the display unit comprises a plurality of display elements arrayed in a matrix, a controller for controlling each display state of each display element, a memory for storing therein each address information for each of the display elements, a signal transmitting section for signal transaction between controllers, and a power transmitting section for supplying power, and the controller executes signal transaction with controllers of any other display units adjacent to the controller through the signal transmitting section, recognizes a size of the screen obtained by connecting a plurality of the display units to each other as well as a position of the unit in the screen, and generates each address information according to the position of the unit to be stored in a memory.

12 Claims, 16 Drawing Sheets

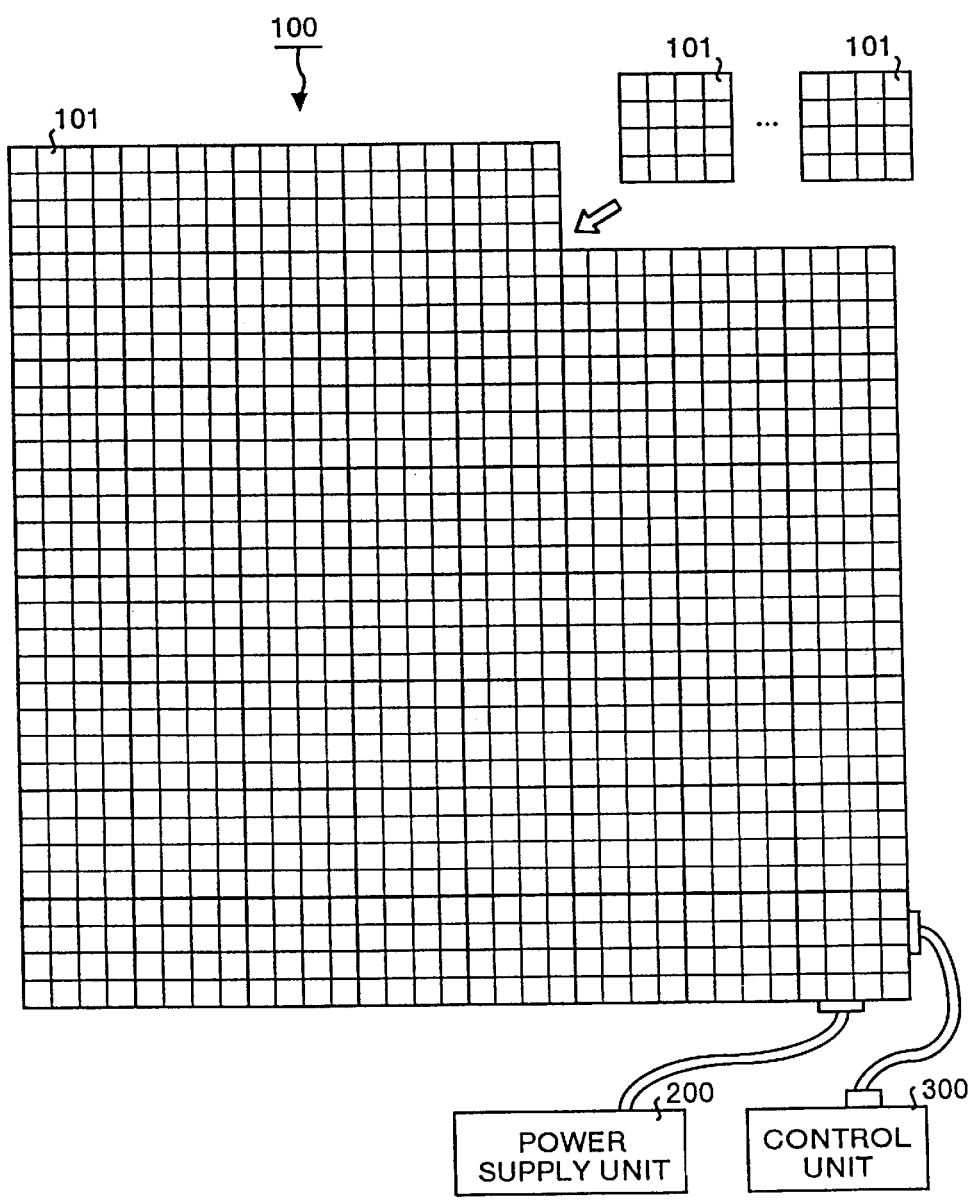

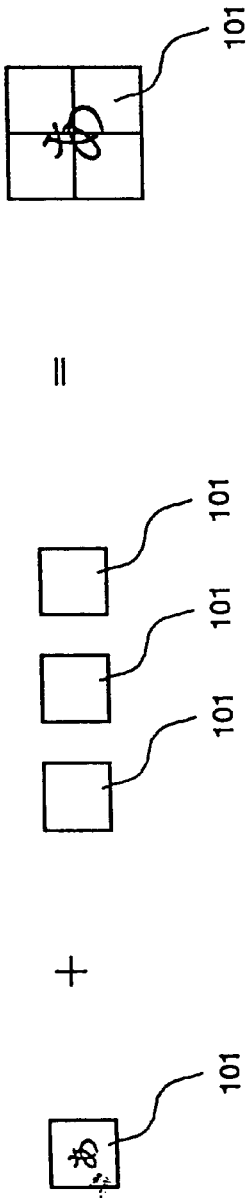
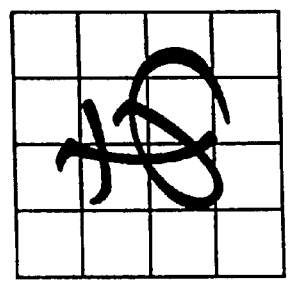
FIG.5A
FIG.5B

TRIMMED IMAGE

| | NUMBER OF DIVIDING TIMES | AREA ADDRESS | NUMBER OF BITS REQUIRED FOR ADDRESS ($2n$) | DISPLAY RESOLUTION ($2^{2n}$) |
|---|---|---|---|---|
| FIG.8A | $n=0$ | | 0 | 1 |
| FIG.8B | $n=1$ | 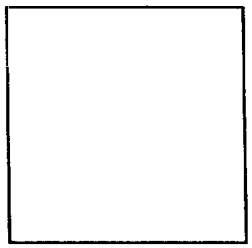 | 2 | 4 |
| FIG.8C | $n=2$ | 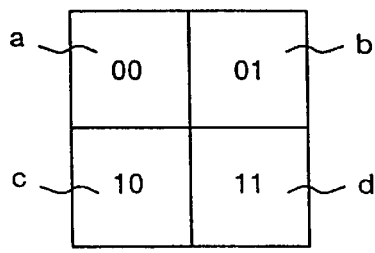 | 4 | 16 |
| FIG.8D | $n=3$ | | 6 | 64 |

EXTENDING TYPE OF DISPLAY APPARATUS AND DISPLAY SYSTEM USING THE SAME

This is a continuation of application Ser. No. 09/086,492 filed May 29, 1998 now U.S. Pat. No. 6,593,902; the disclosure of which is incorporated herein by reference.

FIELD OF THE INVENTION

The present invention relates to an extending type of display apparatus of which a screen can be extended by connecting a plurality of display units each having the same configuration to each other as well as to a display system using the extending type of display apparatus, and more specifically to an extending type of display apparatus of which a size and a shape of the screen can freely and easily be constructed as well as to a display system using the same.

BACKGROUND OF THE INVENTION

In recent years, a display unit such as any display for a television, a monitor, or a personal computer has a larger size and higher resolution. Also the dominating display unit is changing from a CRT to a liquid crystal display unit as well as to a plasma display panel, which has made it possible to make thinner a display unit.

Especially, with progress in the multimedia technology, importance of a display unit is increasing and a demand for a larger sized-screen with higher resolution is becoming increasingly stronger as an indispensable item for accessing the cyber space.

A display unit is used in various cases, so that portability thereof is one of the important elements, and there are increasing use's demands for a display unit which is compact in size for carrying and which has a large-sized screen as well as high resolution when it is assembled, and for a display unit of which the screen can be assembled in an arbitrary size as required, or the like.

According to the conventional type of display unit, however, although progress for larger size and higher resolution thereof has been made, there are some problems as described below because in general, an entire screen of the display unit is manufactured as one unit at the time of manufacturing excluding some large-sized display panel provided on a building as one of facilities thereof such as an electric bulletin board or a sky sign for advertisement.

Firstly, a user can not freely change or select a size of the screen of the display unit.

Secondly, when a user wants to install a display unit with a large-sized screen, the display unit with a screen larger than the size of an entrance of a room can not be carried into the room, so that the display unit can practically be put under restrictions by a size of the entrance thereof.

Thirdly, the display unit having a large-sized screen is inconvenient to carry.

Also an image transmitting system in the conventional type of display unit works based on a scanning line system for continuously transmitting image data at prespecified resolution and the number of scanning lines, and can not basically support cases where the resolution (the number of display elements in the horizontal direction) and the number of scanning lines (the number of display elements in the vertical direction) are changed by arbitrally changing a size of the screen, and for this reason, the manufacturers could hardly think of any idea that a size of a screen could freely be changed by users themselves.

For example, even if resolution (the number of display elements in the horizontal direction) and the number of scanning lines (the number of display elements in the vertical direction) are increased by making the size of the screen larger, the resolution and the number of scanning lines each constituting the image data transmitted in the scanning line system are the same as the original ones, so that an image display using the entire screen is impossible. Also, when the image is to be displayed, the display thereof is performed using a portion of the screen according to the resolution and the number of scanning lines of the transmitted image data. In other words, it is impossible to increase resolution of any image displayed on the screen even if the size of the screen is made larger.

Also, if resolution (the number of display elements in the horizontal direction) and the number of scanning lines (the number of display elements in the vertical direction) are decreased by making the size of the screen smaller, for example, the resolution and the number of scanning lines each constituting the image data transmitted in the scanning line system are still the same as the original ones, so that all the transmitted image data can not be displayed on the screen. In other words, any display unit with a smaller screen results in displaying thereon a portion of the display unit with the larger screen (an image trimmed according to a size of a screen).

SUMMARY OF THE INVENTION

It is an object of the present invention to provide an extending type of display apparatus of which a size of the screen can freely and easily be changed by a user and resolution can also be increased or decreased according to the size of the screen as well as a display system using the same.

It is another object of the present invention to provide an extending type of display apparatus which can display thereon a transmitted image data whatever the size of the screen may be as well as a display system using the same.

With an extending type of display apparatus according to the present invention, the screen can be extended by connecting a plurality of display units each having the same configuration to each other; the display unit comprises a plurality of display elements arrayed in a matrix, a controller for controlling each display state of each of the plurality of display elements, a storing section for storing therein each address information for each of the display elements in the screen, a signal transmitting section for signal transaction between the controller and an external device or any other display units, and a power transmitting section for supplying power to the plurality of display elements, controller, storing section, and the signal transmitting section; the power transmitting section can electrically be connected, when a plurality of display units are connected to each other, to power transmitting sections of any display units adjacent to the power transmitting section; the signal transmitting section can execute, when a plurality of display units are connected to each other, signal transaction with signal transmitting sections of any display units adjacent to the signal transmitting section; and each controller for each of the plurality of display units executes, when a plurality of display units are connected to each other, signal transaction with controllers of any other display units adjacent to the controller through the signal transmitting section, recognizes a size of the screen obtained by connecting a plurality of the display units to each other as well as a position of the unit in the screen, and generates each address information for each display element in the screen according to the position of the unit to be stored in the storing section, so that a user can freely and easily change a size of the screen, and the resolution can be increased or decreased according to the size thereof.

Other objects and features of this invention will become understood from the following description with reference to the accompanying drawings.

BRIEF DESCRIPTION OF THE DRAWINGS

FIG. 1 is a block diagram schematically showing a display system using an extending type of display apparatus according to Embodiment 1 of the present invention;

FIGS. 5A and 5B are explanatory views showing a relation between a size of the screen and resolution when the size of the screen is enlarged;

FIGS. 8A to 8D are explanatory views showing processing to set address information;

DESCRIPTION OF THE PREFERRED EMBODIMENTS

Figure 2A:
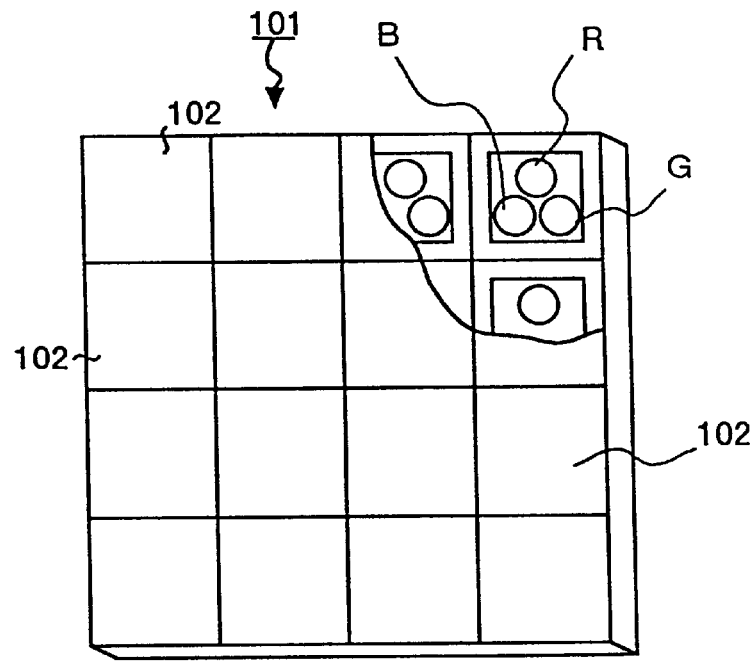
FIGS. 2A and 2B are block diagrams each schematically showing a display unit in an extending type of display apparatus according to Embodiment 1.

Detailed description is made hereinafter for the extending type of display apparatus and the display system using the same according to the present invention in the order of Embodiment 1 and Embodiment 2 with reference to the related drawings.

FIG. 1 shows a schematic block diagram of a display system using an extending type of display apparatus 100 according to Embodiment 1 of the present invention and the system comprises the extending type of display apparatus 100 of which screen can be extended by connecting a plurality of display units 101 each having the same configuration to each other, a power supply unit 200 for supplying power to the extending type of display apparatus 100, and a control unit 300 for supplying a display signal including display address information and display data information indicating display contents to the extending type of display apparatus 100. It should be noted that description of the power supply unit 200 herein assumes a discrete device, but the apparatus may directly be connected to a receptacle for utility power (100 V). Power may also be supplied to the apparatus 100 through the control unit 300.

Figure 2B:
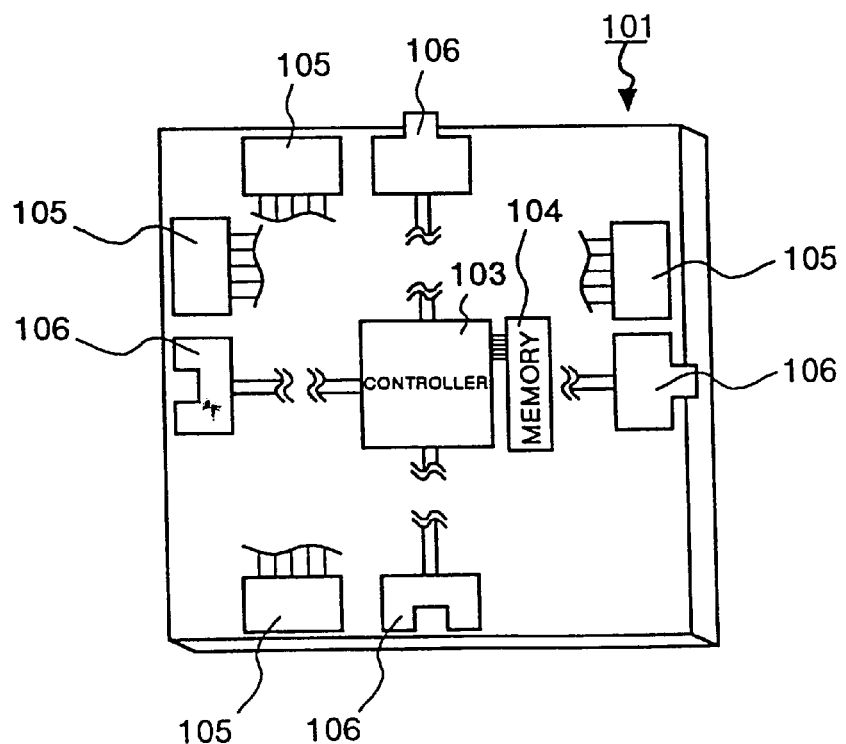

FIG. 2A and FIG. 2B are schematic block diagrams each showing a display unit 101 of the extending type of display apparatus 100, FIG. 2A shows a top side of the display unit 101, and FIG. 2B shows a rear side thereof. The display unit 101 has a plurality of display elements 102 arrayed in a matrix, a controller 103 for controlling each display state of the plurality of display elements 102, a memory (storing section) 104 for storing therein each address information for each of the display elements 102 in a screen obtained by connecting a plurality of display units 101 to each other, a signal transmitting section 105 for signal transaction between the controller 103 and the control unit 300 or some other display elements 102, and a power transmitting section 106 for supplying power to the plurality of display elements 102, controller 103, memory 104, and the signal transmitting section 105 provided therein.

It should be noted that, in order to simplify the description, FIG. 1 and FIG. 2 show examples in each of which 4×4 (16 units) display elements are arrayed in the display unit 101, but the arrangement of display units does not limited to the above examples, and the display unit 101 may have $2^{2m}$ units (m: an integer) of display elements arrayed in a (2 m )×(2 m) matrix, and practically, a degree of integration of the display elements 102 is enhanced according to the necessity. One unit of display element 102 corresponds to one pixel, three light-emitting diodes R, G, B are provided inside one unit of display element 102, so that display can be colored by means of the three colors of R (red), G (green), and B (blue).

Four units of power transmitting section 106 are arranged, when a plurality of display units 101 are connected to each other, at the central positions of the upper side, lower side, left side, and right side of the display unit 101 respectively, as shown in the figure, so that the power transmitting sections 106 of any display units 101 adjacent to each other are electrically connected to each other. Herein, the power transmitting section 106 in the right side and that in the upper side thereof form a convex shape respectively, while the power transmitting section 106 in the left side and that in the lower side thereof form a concave shape respectively, so that the convex shape and concave shape are engaged with each other when the display units 101 are connected to each other. Accordingly, of the plurality of display units 101 connected to each other, when a power transmitting section 106 of any one of the display units 101 is connected to the external power supply unit 200 (Refer to FIG. 1), power is supplied to any other display units 101 through the display unit 101 connected to the external power supply unit 200.

Four units of signal transmitting section 105 are arranged, when a plurality of display units 101 are connected to each other, in the upper side, lower side, left side, and right side of the display unit 101 respectively, as shown in the figure, so that signal transaction can be executed between signal transmitting sections 105 of any display units 101 adjacent to each other. It should be noted that it is assumed herein that the signal transmitting sections 105 are provided at positions displaced from the central positions of the four sides in the display units 101 respectively taking consideration into safety in a case where the display units 101 are arranged at rotated positions therein.

The signal transmitting section 105 comprises an infrared port, and the signal transmitting sections 105 execute bilateral signal transactions in a non-contact form.

Figure 3:
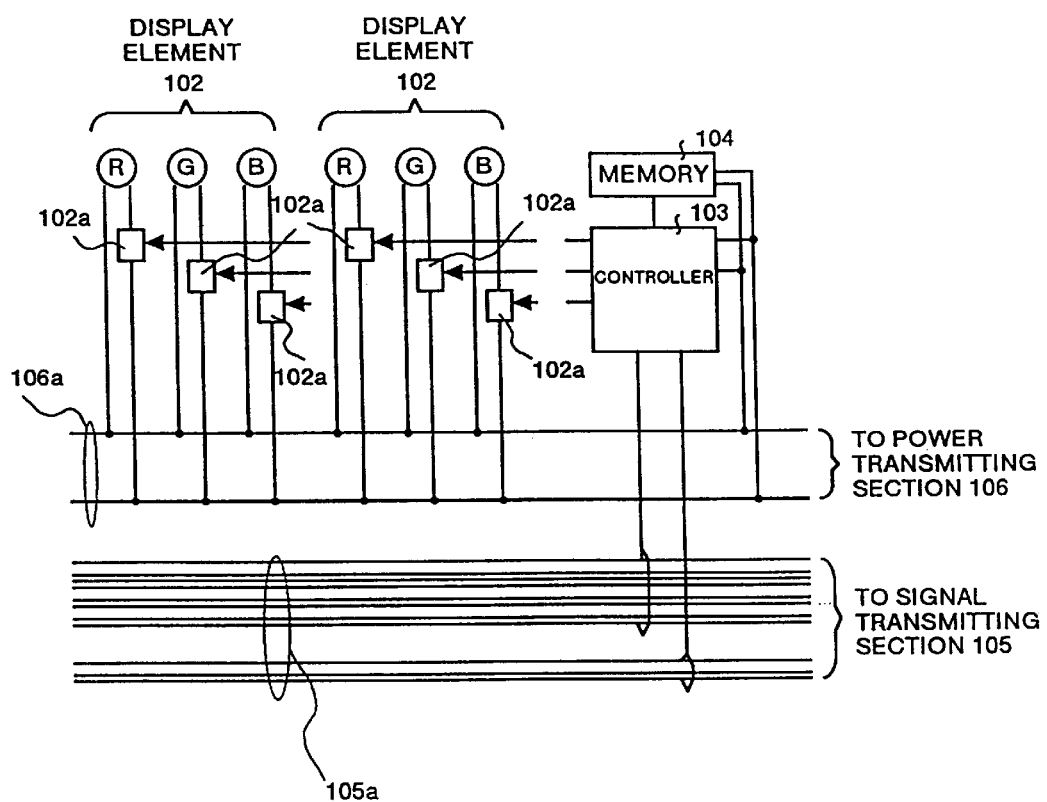
FIG. 3 is a wiring diagram showing the inside of the display unit according to Embodiment 1.

FIG. 3 is a wiring diagram showing the inside of the display unit 101. A power line 106a from the power transmitting section 106 and a signal line 105a from the signal transmitting section 105 are wired inside thereof. Herein, the power line 106a is connected to the controller 103, memory 104, and each of the display elements 102, while the signal line 105a is connected to the controller 103.

As shown in the figure, each control element 102a for controlling each display state of the light-emitting diodes R, G, B is provided in a gap between each of the three light-emitting diodes R, G, B constituting each of the display elements 102 and the power line 106a, and provides control over power supply to each of the light-emitting diodes R, G, B according to a control signal from the controller 103 respectively.

It should be noted that the controller 103 executes, when a plurality of the display units 101 are connected to each other, signal transaction with controllers 103 of any other display units 101 adjacent to the controller 103 through the signal transmitting sections 105, recognizes a size of the screen obtained by connecting a plurality of the display units 101 to each other as well as a position of the unit in the screen, and generates each address information for each of the display elements 102 in the screen according to the position of the unit to be stored in the memory 104.

With the configuration as described above, description is made for the operations in the order of (1) a method of changing a screen size and resolution using display units, (2) processing to set address information by the controller, (3) a data structure of a display signal, and (4) processing to display image data for the extending type of display apparatus.

(1) A Method of Changing a Screen Size and Resolution Using Display Units

Figure 4A:
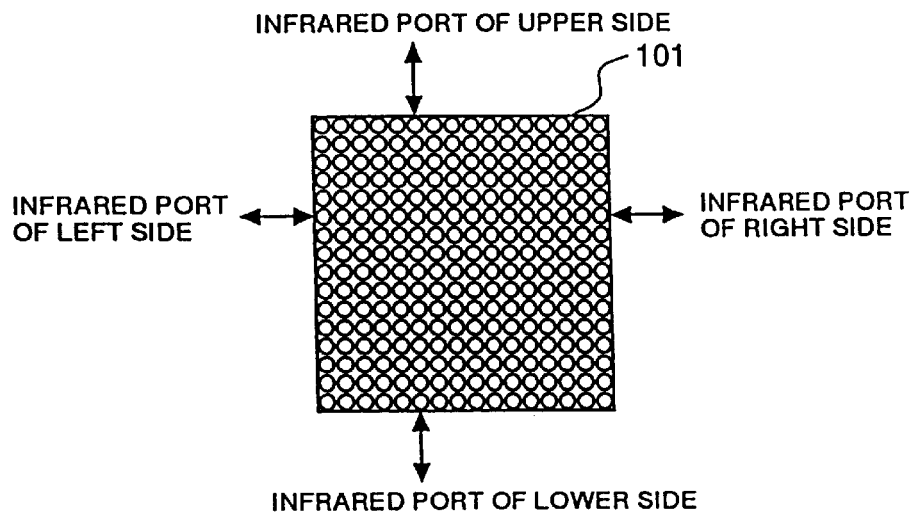
FIGS. 4A and 4B are explanatory views showing change in a size of a screen as well as in resolution in a case where four display units are used in Embodiment 1.
Figure 4B:
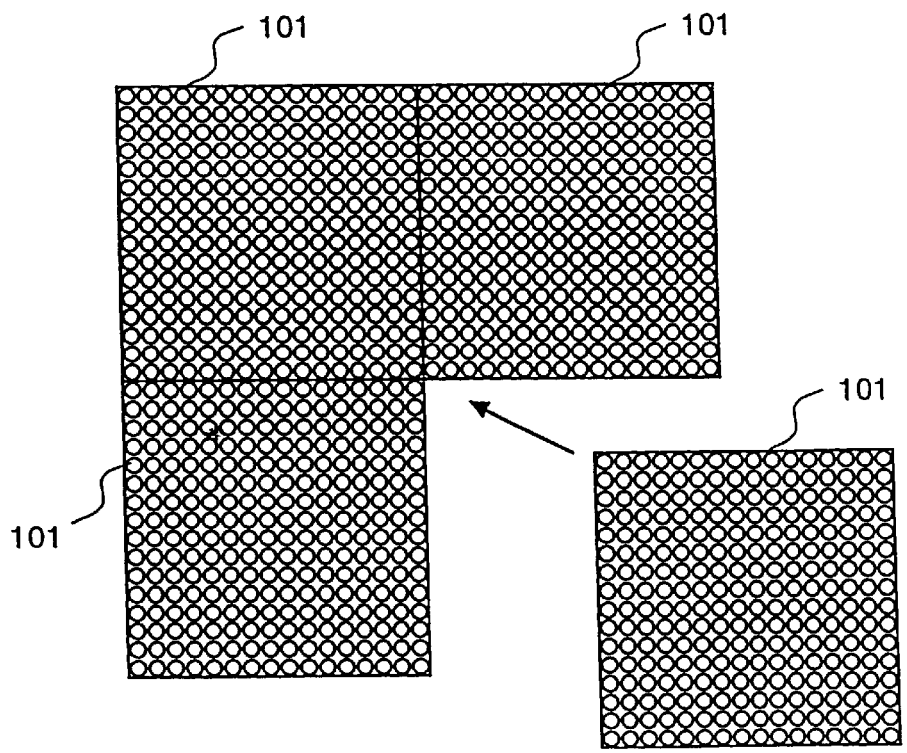

Description is made for operations for changing a screen size as well as resolution assuming that four display units 101 are used with reference to FIG. 4A and FIG. 4B. Assuming that one display unit 101 has 256 units of display element 102 as shown in FIG. 4A, any image can be displayed on a screen with 256 dots (pixels) in one display unit 101. It should be noted that a display element 102 is shown herein by one unit of light-emitting diode indicated by a sign ○ (circle).

In this display unit 101, four units of signal transmitting section 105 (infrared ports) are arranged at positions in the upper side, lower side, left side, and right side of the display unit 101 each displaced from a center thereof respectively. Accordingly, there are upper, lower, left, and right sides in the structure of the display unit 101. With this structure, the controller 103 can accurately recognize a position (namely coordinates) of each display element 102 on the display unit 101 at any time.

A user can easily assemble, when a screen size is enlarged by using the four display units 101 each comprising 256 dots, a screen by engaging power transmitting sections 106 with each other in the display units 101 adjacent to each other with careful attention so that signal transmitting sections 105 of the display units 101 are placed in positions opposite to each other respectively. It should be noted that only connection of the power transmitting sections 106 of the display units 101 is shown herein to make the description simpler, but practically, any frame is provided as required in consideration of connection strength between display units 101 and strength of the entire screen.

Only by arranging the signal transmitting sections 105 simply opposite to each other as described above because of each of the sections comprising a bi-directional infrared port, an assembly work can easily be carried out without requiring connection of a signal line between display units 101, which is convenient in use.

All the display units have the same configuration as each other, which allows the display units to freely be arranged. Accordingly, the units are interchangeable without any trouble, whereby assembly thereof is easier.

For example, if any image (herein, a character "あ" (one of Japanese characters (Kana) which is pronounced "a")) displayed on a screen comprising one display unit 101 is displayed, as shown in FIG. 5A, on a screen comprising four display units 101, the image can be displayed on the screen with a size four times as large as that of the above screen and with resolution four times as high as that of the above screen. Similarly, as shown in FIG. 5B, the image can be displayed on a screen with a size 16 times as large as that of the above screen and with resolution 16 times as high as that of the above screen in the example of combining 16 display units 101 therein. It should be noted that resolution and the number of scanning lines are specified in image data transmitted in the conventional type of scanning line system, and for this reason, even if the resolution (the number of display elements) is increased by making a size of a screen larger, it is impossible to display an image at higher resolution on the enlarged screen. Accordingly, the processing described later is executed to solve the above problem: (2) the processing to set address information by a controller, (3) the processing for a data structure of a display signal, and (4) the processing to display image data for the extending type of display apparatus.

Figure 6C:
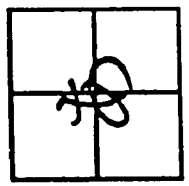
FIGS. 6A to 6C are explanatory views showing a relation between a size of the screen and resolution when a size of the screen is diminished.
Figure 6B:
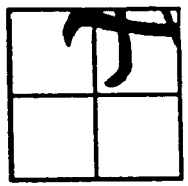
Figure 6A:
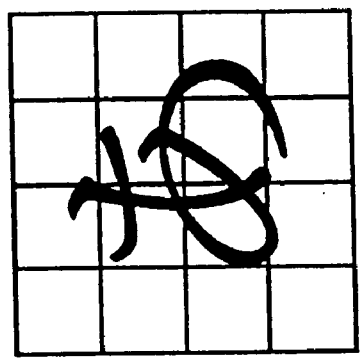

On the other hand, the image (a Kana character "あ" (pronounced "a")) displayed on a screen with a size as shown in FIG. 6A is changed, when it is simply displayed on a ¼-sized screen, to the image trimmed as shown in FIG. 6B. It is required to reduce resolution of the image data according to a size of the screen to display the image thereon as a reduced one as shown in FIG. 6C according to the size of the screen (or the resolution of the screen). Accordingly, the processing described later is executed to solve the above problem: (2) the processing to set address information by a controller, (3) the processing for a data structure of a display signal, and (4) the processing to display image data for the extending type of display apparatus.

(2) Processing to Set Address Information by a Controller

When display units 101 are connected to each other as described above to make up a desired-sized screen and the power supply unit 200 is connected to any one of power transmitting sections 106 of the display units 101, a controller 103 for the display unit 101 connected to the power supply unit 200 outputs a command for starting an operation for setting address information through the signal transmitting section 105 to any other display units 101.

The controllers 103 for all the display units 101 constituting the screen execute, when having received the start command, signal transaction with controllers for any other display units adjacent to each other, determine how many display units are present in the right side, left side, upper side, and lower side from each of the units respectively, and recognize a size of the screen and a position of each of the units in the screen.

Figure 7A:
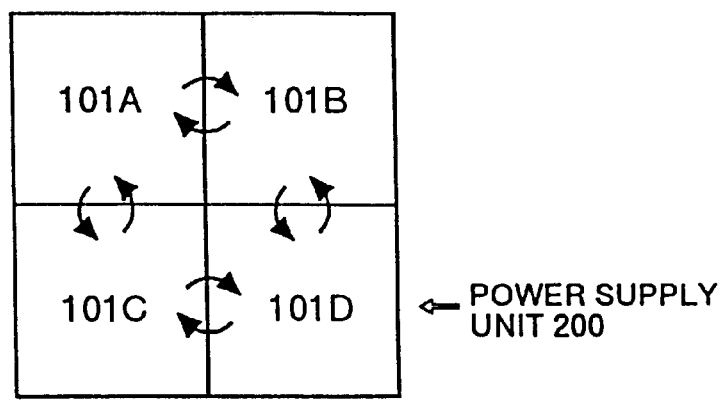
FIGS. 7A and 7B are explanatory views showing a method of recognizing a size of the screen and a position of the unit.

To describe more specifically, as shown in FIG. 7A, for example, when the screen comprises four display units 101A to 101D arranged therein and if the power supply unit 200 is connected to the display unit 101D, a start command is outputted from the controller 103 for the display unit 101D to the display units 101A, 101B, and 101C, then each of the display units notifies how many display units are present in the left side from each of the units to any display unit next to each of the units in the right side, similarly, notifies how many display units are present in the right side from each of the units to any display unit next to each of the units in the left side, notifies how many display units are present in the lower side from each of the units to any display unit next to each of the units in the upper side, and notifies how many display units are present in the upper side from each of the units to any display unit next to each of the units in the lower side.

Accordingly, herein, by notifying that there is "0 unit" in the left side of the unit 101A from the unit 101A to the unit 101B, the unit 101B determines that there is only the unit 101A (namely "one unit") in the left side therefrom, and also recognizes that the screen in the side to side direction comprises two display units adding thereto the unit itself.

Also, the unit 101B receives a report that there is "0 unit" in the lower side of the unit 101D therefrom, so that it determines that only the unit 101D (namely "one unit") is present in the lower side therefrom, and also recognizes that the screen in the vertical direction comprises two display units adding thereto the unit itself. Accordingly, the unit 101B can recognize a size of the screen from the number of display units in the side to side direction as well as in the vertical direction, and can also recognize a position of the unit itself in the screen.

Each of the other display units 101A, 101C, and 101D can recognize in the same manner a size of the screen and a position of each of the units therein.

Figure 7B:
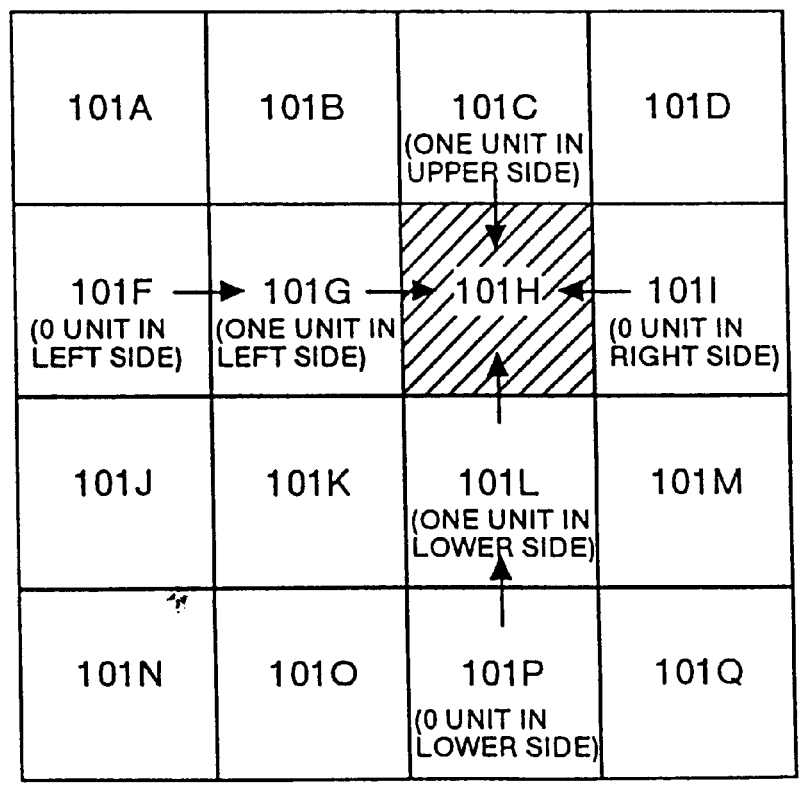

It should be noted that, when 16 display units 101A to 101Q constitute the screen, as shown in FIG. 7B, each of the display units can also recognize a size of the screen and a position of each of the units therein in the same sequence of the processing as described above. It should be noted that, if any display units adjacent to each of the units are present in all the upper side, lower side, left side, and right side from each of the units, each of the above units first receives information from any other display units, and then can notify the information to any other display units. For example, in a case of the unit 101H, it can not notify "one unit" present in the upper side therefrom to the unit 101L before the unit 101H has received the report on "0 unit" present in the upper side of the unit 101C therefrom.

Each controller 103 having recognized a size of the screen as well as a position of each of the units as described above sets, in the method illustrated in FIG. 8A to FIG. 8D, each address information for each display elements controlled by each of the units in the screen.

FIG. 8A shows an entire screen obtained by connecting a plurality of display units 101 to each other, and shows a state of the entire screen recognized as one area (in other words, one pixel). In this case, the number of dividing times of the screen is "0", and display resolution (in other words, the number of areas: resolution) is "1", and the number of bits required for an address for specifying this area is "0" (which indicates only one area).

When any address information is to be set, at first, the screen shown in FIG. 8A is divided into four first areas as shown in FIG. 8B, and first area addresses with two bits of "00", "01", "10", "11" each correlated to each position of the divided screens (areas a to d) are appended to the first areas' respective addresses. In this case, the number of dividing times of the screen is "1", display resolution (in other words, the number of areas) is "4", and the number of bits required for an address for specifying each of the areas is "2".

Then, each of the 1/4 screens (the areas a to d) specified by one of the first area addresses is further divided into four second areas, and second area addresses with two bits of "00", "01", "10", "11" each correlated to each position of the divided screens are appended to the second areas' respectively addresses. For example, when the area a is further divided into four areas and the second area addresses are added to the four respective areas' addresses, as shown in FIG. 8C, the area e can be specified by "0000", the area f by "0001", the area g by "0010", and the area h by "0011" by using the corresponding first area address as well as second area address respectively. In this case, the number of dividing times of the screen is "2", display resolution (in other words, the number of areas) is "16", and the number of bits required for an address for specifying each of the areas is "4".

Then, each of the 1/16 screens specified by one of the second area addresses is further divided into four third areas, and third area addresses with two bits of "00", "01", "10", "11" each correlated to each position of the divided screens are appended to the second areas' respective addresses. For example, one of the 1/16 screens indicated by the area i can be specified by "010101". In this case, the number of dividing times of the screen is "3", display resolution (in other words, the number of areas) is "64", and the number of bits required for an address for specifying each of the areas is "6".

The processing for dividing the screen is repeated n times thereafter so that the number of display elements 102 in the divided screen (namely each area) will be one unit therein, and then the obtained n-th area address is added to the area, whereby each address information for each of the display elements 102 is finally set by rows of bits arrayed in the order from the first area address to the n-th area address.

It should be noted that, in Embodiment 1, it is assumed that any of the display units 101 has configuration in which $2^{2m}$ units (m: an integer) of display element are arrayed in a (2 m)×(2 m) matrix, so that the display unit 101 is divided into four areas repeatedly to finally reach one unit of display element 102.

By setting each address information as described above, any position (address information) of each display element 102 can be specified even if the screen comprises an arbitrary number of display units 101 connected to each other therein.

Stored in the memory 104 of each of the display units 101 constituting the screen is each address information for each of the display elements 102 as rows of bits arrayed in the order from the first area address to the n-th area address each set based on the number of dividing times of the screen from the entire screen, so that, by specifying a range to be used from the first area address to the allowable maximum area address, the extending type of display apparatus 100 can be used as a screen having display resolution corresponding to the number of dividing times of the screen for the specified area address. In other words, the extending type of display apparatus 100 can be used at arbitrary resolution with the display resolution when addresses as far as the n-th area address are used regarded as the maximum resolution.

It should be noted that the processing to set the address information can be performed for each time upon power ON, but the same address information can basically be used so far as the screen size is not changed and a display unit is not replaced with another one, and for this reason it is programmed so that each controller 103 controls only each connection state of display units 101 adjacent to the unit after the address information is set and that any controller 103 detecting some change in the connection state outputs a start command of setting address information to any other display units.

(3) Data Structure of a Display Signal

Figure 9:
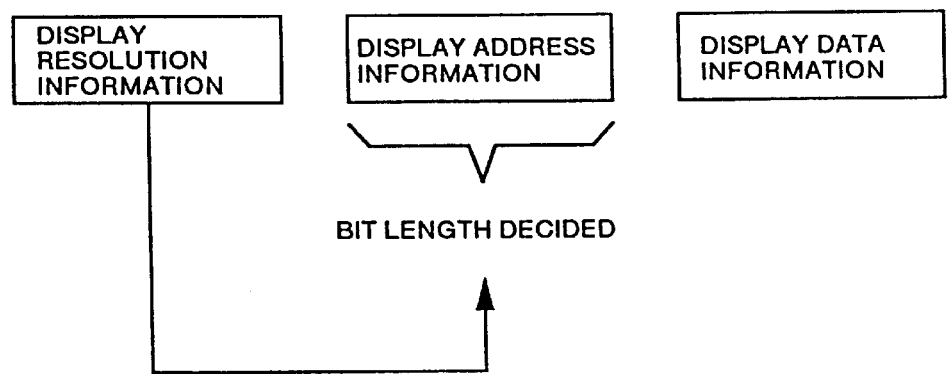
FIG. 9 is an explanatory view showing a data structure of a display signal.
Figure 10:
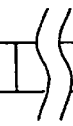
FIG. 10 is an explanatory view showing a correlation among the number of dividing times, information for display resolution, a bit length of display address information and display resolution.

Next description is made for a data structure of a display signal outputted from the control unit 300 with reference to FIG. 9 and FIG. 10. As described in (2) "processing to set address information by a controller" above, address information is set in the extending type of display apparatus 100 as rows of bits arrayed in the order from the first area address to the n-th area address each set according to the number of dividing times of the screen from the entire screen, so that, by specifying a range to be used from the first area address to any order of the area address, the extending type of display apparatus 100 can be used as a screen having display resolution corresponding to the number of diving times of the screen for the specified area address. In other words, the extending type of display apparatus 100 can be used at arbitrary resolution with the display resolution when addresses as far as the n-th area address are used regarded as the maximum resolution.

Accordingly, a display signal comprises, as shown in FIG. 9, display resolution information for specifying each display resolution, display address information for specifying a display element, and display data information indicating display contents of the display element specified by the display address information. As clearly understood from the data structure described above, the display signal comprises transmission address information specified by the display resolution information as well as by the display address information and display data information as a command to the transmission address, whereby it is possible to accurately send the corresponding display data to any display element 102 in the target transmission address even if the display data is transmitted through any line in packet communications.

The display resolution specified by the display resolution information corresponds to the number of dividing times of a screen as described above, and it is decided by the number of times of the division to which order of the area address is to be used (in other words, a bit length in the address information to be used). FIG. 10 shows a correlation among the number of dividing times, display resolution information, a bit length of display address information, and display resolution, and 4-bit display resolution information can deal with display address information as far as one having a bit length of 30 bits (the 15th area address). The display resolution at that time is 1 G (giga), so that it is sufficient to satisfy any demands for high resolution that is currently conceivable.

(4) Processing Display Image data for the Extending Type of Display Apparatus

Figure 11A:
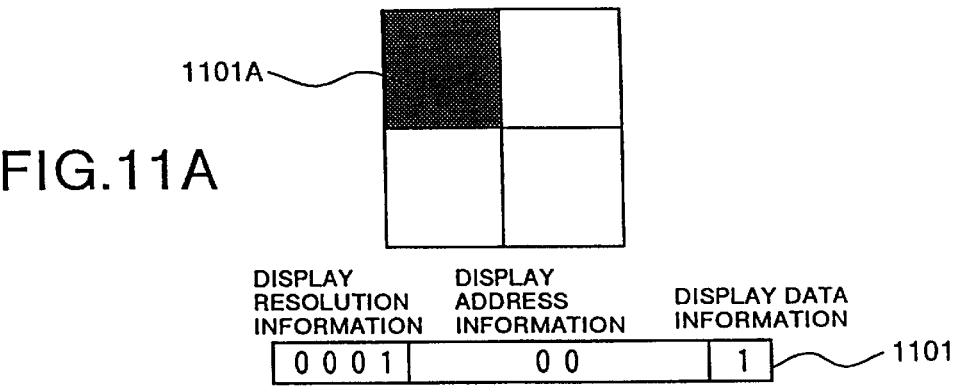
FIGS. 11A to 11C are explanatory views showing display processing to display image data in the extending type of display apparatus according to Embodiment 1.
Figure 11B:
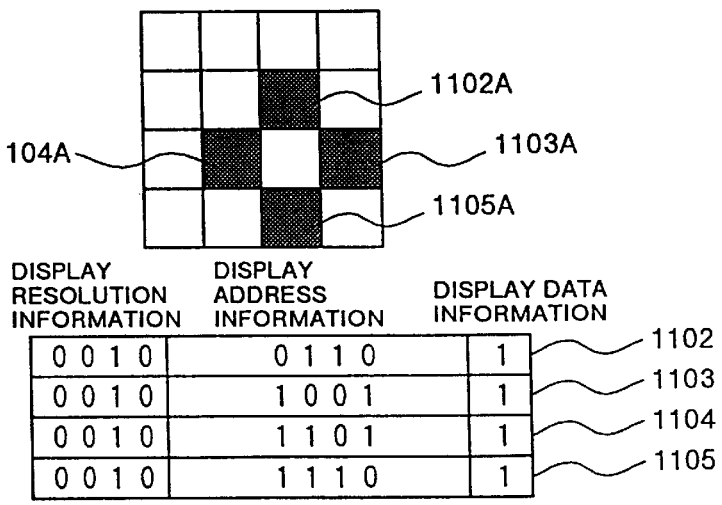
Figure 11C:
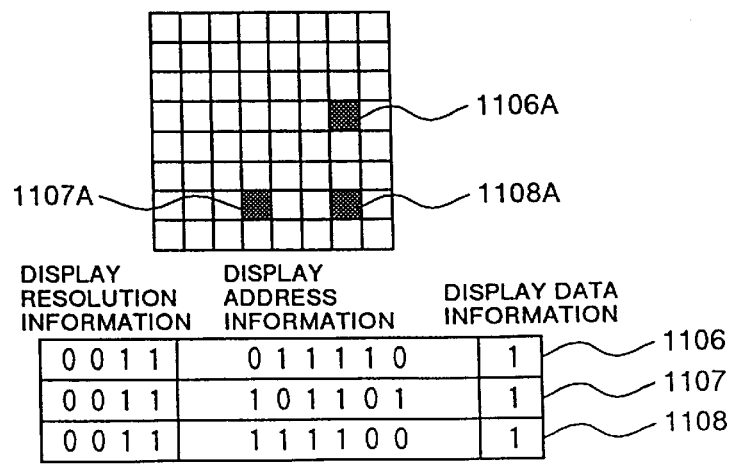

Next description is made for processing display image data for the extending type of display apparatus with reference to FIG. 11A to FIG. 11C. The extending type of display apparatus 100 transfers, when having received a display signal (image data) from the control unit 300, the display signal to all the display units 101 constituting the screen through each signal transmitting section 105 of each of the display units 101.

On the other hand, each controller 103 determines, when having received the display signal, a bit length of the display address information by referring to four bits in the header of the display signal (namely, display resolution information). Assuming herein that the display signal 1101 shown in FIG. 11A has been received, it is determined that a bit length of the display address information is two bits from the display resolution information "0001", therefore "00" in the fifth bit and sixth bit of the display signal is taken out as display address information, and determination is made as to whether any address information matching the display address information is present or not by referring to higher two bits of each address information stored in the memory 104 of the unit. If it is determined that any matching address information is present therein, a display state for all the display elements having the corresponding address information is changed according to the display data information in the seventh bit of the display signal. On the other hand, if it is determined that any matching address information is not present therein, a display state thereof is not changed. As a result, all the display elements 102 in the area 1101A having address information of "00" are turned ON according to the display data information "1". It should be noted that expression herein is made in single color which indicates an ON/OFF control over the display state to make the description simpler, but it is needless to say that color display can be performed by discretely providing ON/OFF control as well as brightness-adjusting control over each of three light-emitting diodes R, G, B constituting the display element 102.

Also, the controller 103 determines, when having received display signals 1102 to 1105, that a bit length of the display address information is four bits from the display resolution information "0010", therefore the four bits in the fifth bit to the eighth bit of the display signal are taken out as display address information, and determination is made as to whether any address information matching the display address information is present or not by referring to higher four bits of each address information stored in the memory 104 of the unit. If it is determined that a matching address information is present therein, each display state for all the display elements having the corresponding address information is changed according to the display data information in the ninth bit of the display signal. As a result, all the display elements 102 in an area 1102A having address information of "0110" are turned ON according to the display data information "1". Similarly, the display elements 102 in an area 1103A having address information of "1001", those in an area 1104A having address information of "1101", and those in an area 1105A having address information of "1110" are turned ON according to the display data information "1".

The controller 103 determines, when having received display signals 1106 to 1108, that a bit length of the display address information is six bits from the display resolution information "0011", therefore the six bits in the fifth bit to the 10th bit of the display signal are taken out as display address information, and determination is made as to whether any address information matching the display address information is present or not by referring to higher six bits of each address information stored in the memory 104 of the unit. If it is determined that a matching address information is present therein, each display state for all the display elements having the corresponding address information is changed according to the display data information in the 11th bit of the display signal. As a result, the display elements 102 in an area 1106A having address information of "011110", those in an area 1107A having address information of "101101", and those in an area 1108A having address information of "111100" are turned ON according to the display data information "1".

With Embodiment 1 as described above, it is possible to provide an extending type of display apparatus as well as a display system using the extending type of display apparatus of which the screen size can freely and easily be changed by a user and resolution can be increased or decreased according to the size of the screen. It is also possible to provide an extending type of display apparatus as well as a display system using the extending type of display apparatus which can display thereon transmitted image data whatever the size of the screen may be.

To be described concretely, the extending type of display apparatus 100 of which the screen is extended to a desired size is mounted on a wall inside a room so that it can be used as a wall-mounted television set. For mounting it on a wall, a user purchases a desired number of display units 101 with which a desired sized-screen can freely be made up, so that it is possible to realize a large-sized screen with high resolution matching a size of the room.

Also, by applying the extending type of display apparatus 100 according to Embodiment 1 to a device having a small sized-screen such as a laptop type of personal computer, it is possible to obtain a laptop type of personal computer having a large-sized screen with high resolution by adding screens (display units 101) thereto as required. In addition, for carrying it, the apparatus becomes portable by being disassembled to a compact size, which is extremely handy.

In a display system using the extending type of display 20 apparatus according to Embodiment 2, a control unit generates address information and stores it in a storing section of the extending type of display apparatus in place of internally setting address information for each display element in the extending type of display apparatus.

Figure 12:
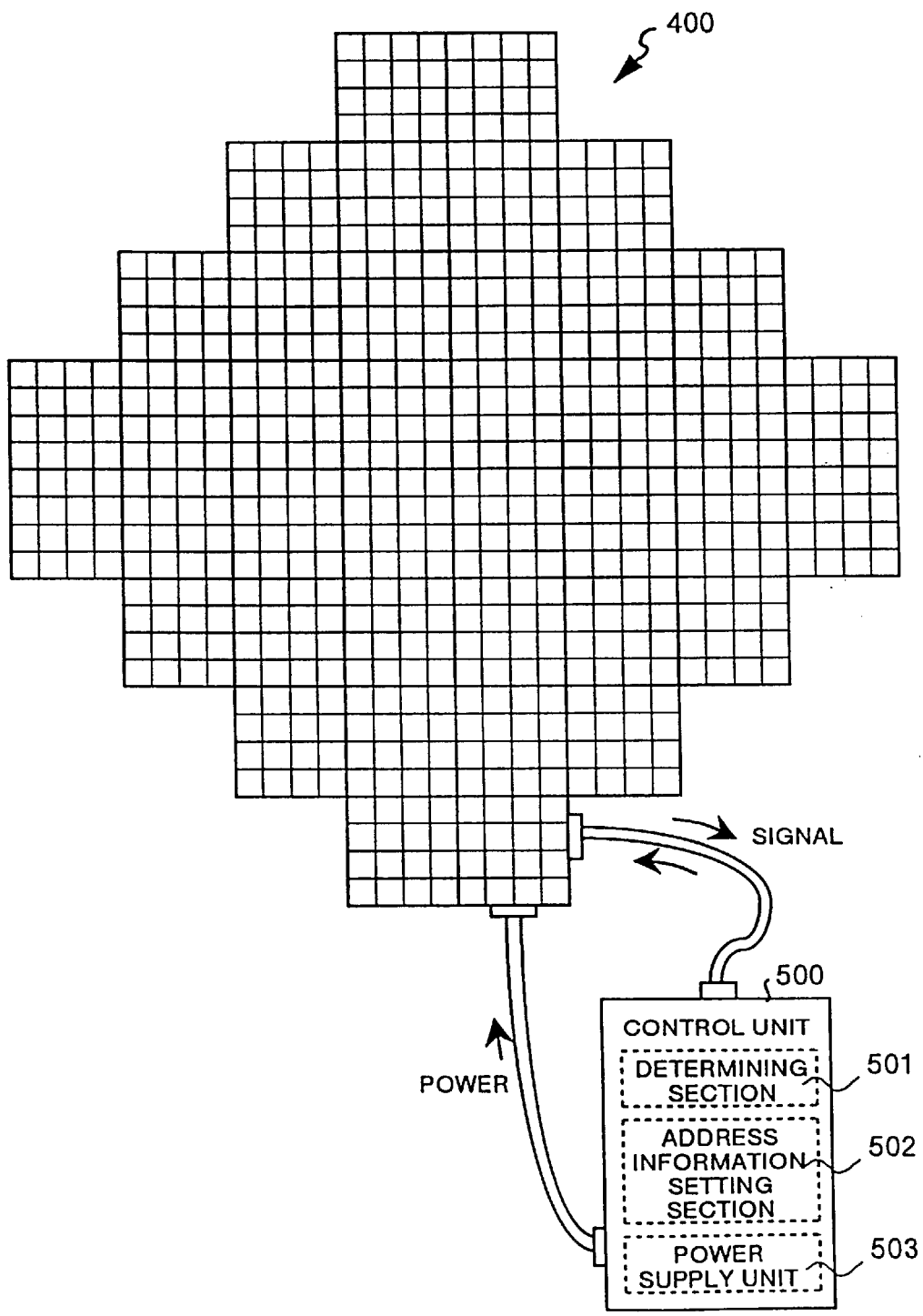
FIG. 12 is a block diagram schematically showing a display system using an extending type of display apparatus according to Embodiment 2 of the present invention.

FIG. 12 shows a schematic block diagram of a display system using an extending type of display apparatus 400 according to Embodiment 2 of the present invention and the system comprises the extending type of display apparatus 400 of which the screen can be extended by connecting a plurality of display units 101 each having the same configuration to each other, and a control unit 500 for supplying power to the extending type of display apparatus 400 as well as for supplying thereto a display signal including display resolution information, display address information, and display data information. It should be noted that the control unit 500 herein plays a roll as a power supply unit, but power may be supplied, for instance, by directly connecting the extending type of display apparatus 400 to the home power supply unit.

The configuration of the extending type of display apparatus 400 is basically the same as that according to Embodiment 1, but a controller 103 in the display unit 101 does not set address information.

The control unit 500 comprises, as shown in the figure, a determining section 501 for receiving each connection state of any display units 101 adjacent to each other from each display unit 101 for the extending type of display apparatus 400 and determining a size and a shape of the entire screen of said extending type of display apparatus 400, an address information setting section 502 for generating each address information for a display element 102 of each of the display units 101 according to the size and shape of the screen determined in the determining section 501 and setting the address information in the memory 104 of the corresponding display unit 101, and a power supply unit 503 for supplying power to the extending type of display apparatus 400.

In the configuration as described above, description is made for the operations in the order of (5) processing to determine a size and a shape of the entire screen by the determining section and (6) processing to set address information by the address information setting section.

Figure 13A:
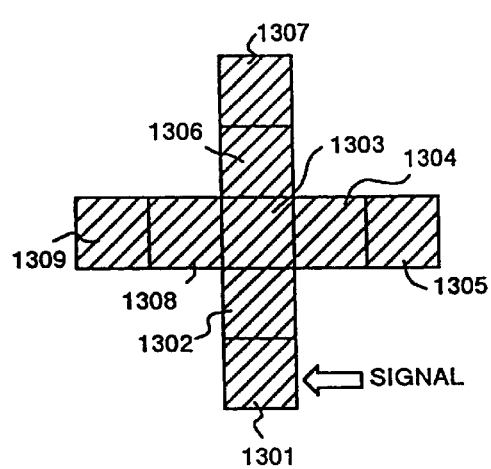
FIGS. 13A to 13D are explanatory views showing processing to determine a size and a shape of the entire screen of the extending type of display apparatus by a determining section of a control unit according to Embodiment 2.

(5) Processing to Determine a Size and a Shape of the Entire Screen by the Determining Section Description is made for processing to determine a size and a shape of the entire screen of the extending type of display apparatus 400 by the determining section 501 in the control unit 500. It should be noted that, to make the description simpler, description herein assumes a case, as shown in FIG. 13A, where the extending type of display apparatus 400 is structured as a screen in a cross shape obtained by combining nine display units 1301 to 1309 with each other and a signal transmitting section 105 (not shown in the figure) of the display unit 1301 is connected to the control unit 500.

The determining section 501, at first, receives, assuming that one display unit (the display unit 1301 herein) directly connected to the control unit 500 is present at coordinates (0, 0) on the x-y plane, each connection state of any display units adjacent to the display unit 1301 at the coordinates (0, 0) therefrom. Herein, as shown in FIG. 13A, there exists a display unit 1302 in the upper side of the display unit 1301.

Figure 13B:
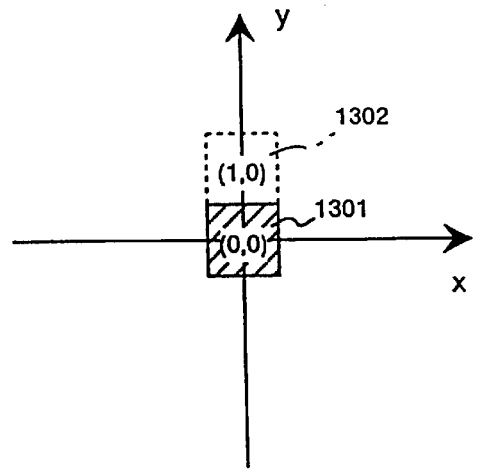

Then the determining section 501 determines that the display unit 1302 is present at a position at coordinates (1, 0) on the x-y plane, as shown in FIG. 13B, according to the connection state received from the display unit 1301, then receives each connection state of any display units adjacent to the display unit 1302 at coordinates (1, 0) therefrom. There exists herein, as shown in FIG. 13A, a display unit 1303 in the upper side of the display unit 1302.

Figure 13C:
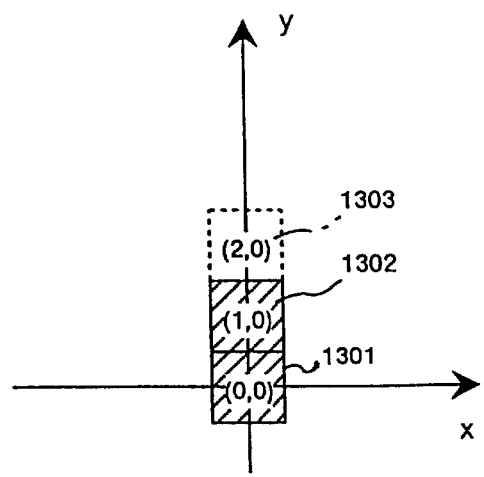

Then the determining section 501 determines that the display unit 1303 is present at a position at coordinates (2, 0) on the x-y plane, as shown in FIG. 13C, according to the connection state received from the display unit 1302, then receives each connection state of any display units adjacent to the display unit 1303 at coordinates (2, 0) therefrom. There exist herein, as shown in FIG. 13A, a display unit 1304 in the right side of the display unit 1303, a display unit 1306 in the upper side thereof, and a display unit 1308 in the left side thereof.

The same processing is repeated thereafter and on from the time when a display unit is arranged at a position at the corresponding coordinates on the x-y plane according to a received connection state until it is recognized that no display unit adjacent to the unit exist from the final connection state.

Figure 13D:
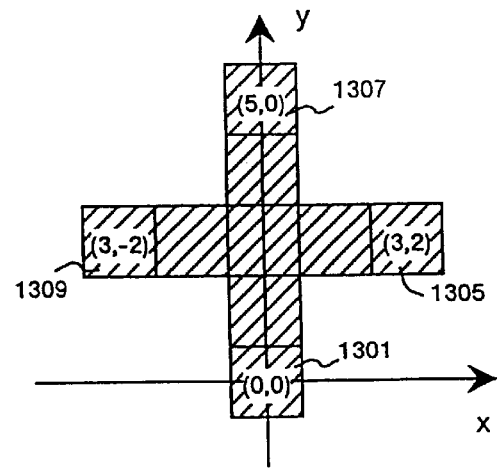

As described above, all the display units 1301 to 1309 constituting the screen can be arranged on the x-y plane, as shown in FIG. 13D, and with this operation, a size and a shape of the screen of the extending type of display apparatus 400 can be specified.

Figure 14:
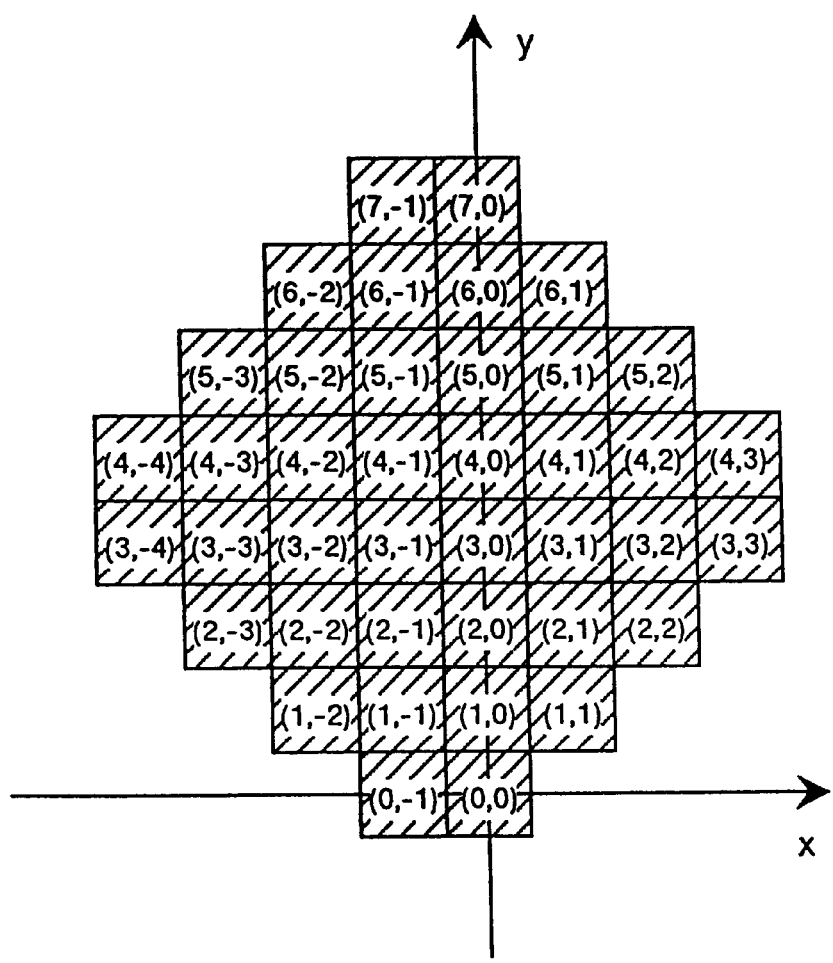
FIG. 14 is an explanatory view showing an example of a screen (each display unit) of the extending type of display apparatus shown in FIG. 12 by converting the screen to a coordinate system on the x-y plane.

FIG. 14 shows, like in the processing as described above, each display unit for the extending type of display apparatus 400 shown in FIG. 12 by converting it to coordinates on the x-y plane to be arranged thereon.

Figure 15A:
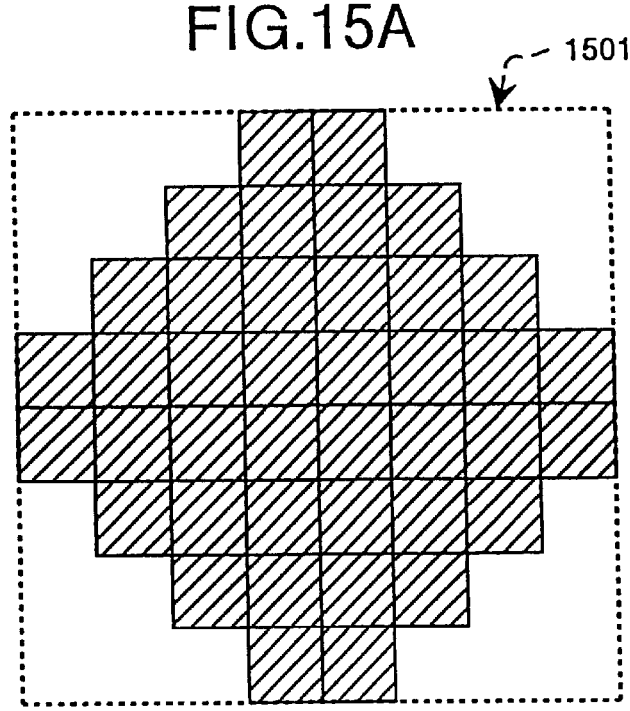
FIGS. 15A and 15B are explanatory views showing processing to set address information by an address information setting section according to Embodiment 2.

(6) Processing to Set Address Information by the Address Information Setting Section The address information setting section 502 assumes, when having received the coordinates on the x-y plane for each display unit as a size and a shape of the screen of the extending type of display apparatus 400 from the determining section 501, as shown in FIG. 15A, a minimum rectangular area circumscribing the screen of the extending type of display apparatus 400 as a virtual screen 1501.

Figure 15B:
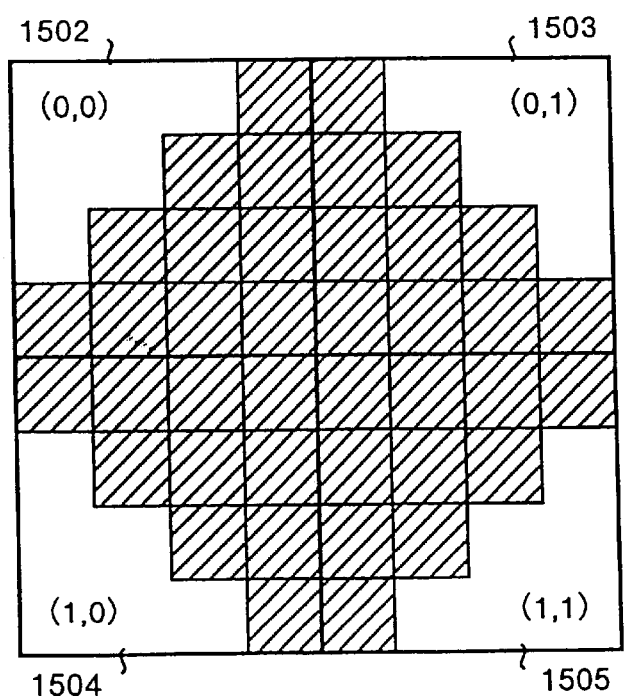

Then, using the method according to Embodiment 1 described in FIG. 8A to FIG. 8D, this virtual screen 1501 is divided, as shown in FIG. 15B, first area addresses 1502 to 1505 are decided, then the processing for division is repeated n times thereafter until the number of display element 102 in a divided screen (namely an area) is one unit, and an n-th area address is added to the area, whereby, address information of each of the display elements 102 is decided by rows of bits obtained by finally arraying addresses in the order from the first area address to the n-th area address.

The address information setting section 502 transmits, when the address information for all the display units 102 has been decided, the corresponding address information to and stores it in the memory 104 of each display unit 101 through each controller 103 of each of the display units 101 in the extending type of display apparatus 400.

It should be noted that transmission of address information from the address information setting section 502 to each of the display units 101 may be performed, for instance, by previously setting each identification number (e.g. unit address) specific to each of the display units 101 at the time of manufacturing it, specifying a display unit 101 using the identification number, and transmitting the corresponding address information, or by sending, when the determining section 501 receives each connection state from each of the display units 101, coordinates on the x-y plane as a temporary identification number for specifying each of the display units 101 to each controller 103 for each of the display units 101, specifying a display unit 101 using the coordinates on the x-y plane, and transmitting the corresponding address information thereto.

In the latter method of using coordinates on the x-y plane, it is not required to set an identification number in manufacture, and the information in the memory 104 of each of the display units 101 can completely be the same, whereby it is possible to simplify manufacturing steps and also to make complete compatibility and the identity of the display units.

It should be noted that, as clearly understood from the description so far, when each address information for each display element 102 is to be decided, address information for one unit of display element 102 is finally decided by repeating division of the area (divided into four areas), so that a size and a shape of the area (entire screen) to start division thereof requires $2^{2n}$ units (n indicates an integer and is the same value as the number of dividing times n) of display element 102 arrayed in a (2 n)×(2 n) matrix.

However, the screen of the extending type of display apparatus 400 is structured with display units 101 freely combined by the user, so that the entire screen is not always structured with $2^{2n}$ units (n indicates an integer and is the same value as the number of dividing times n) of display element 102 arrayed in a (2 n)×(2 n) matrix.

On the other hand, the display unit 101 as described above is structured with $2^{2m}$ units (m: an integer) of display element 102 arrayed in a (2 m)×(2 m) matrix, so that the display unit 101 is further divided (into four areas) to finally reach one unit of display element 102.

Accordingly, the address information setting section 502 sets, when having received a size and a shape of the screen of the extending type of display apparatus 400 from the determining section 501 and assumed the minimum rectangular area circumscribing the screen of the extending type of display apparatus 400 as a virtual screen, sets address information so that the virtual screen is structured for with $2^{2i}$ units (i: an integer) of display unit 101 arrayed in a (2 i)×(2 i) matrix. Namely, the virtual screen is further divided (into four areas) to surely reach one display unit 101, and one display unit 101 is further divided (into four areas) to finally reach one unit of display element 102.

Figure 16A:
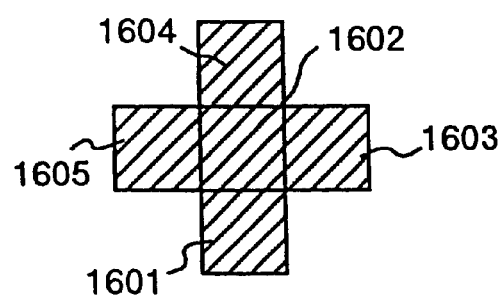
FIGS. 16A to 16D are explanatory views showing processing to set address information by the address information setting section according to Embodiment 2.
Figure 16B:
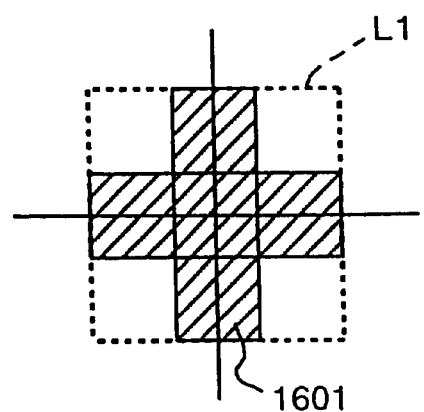

To be more specific, as shown in FIG. 16A, when a screen comprises five display units 1601 to 1605, assuming a minimum rectangular area circumscribing the screen as a virtual screen, the virtual screen L1 shown in FIG. 16B is obtained. When division (into four areas) is repeated to this virtual screen, however, it is not always sure that the screen can finally reach one unit of display element 102.

Figure 16C:
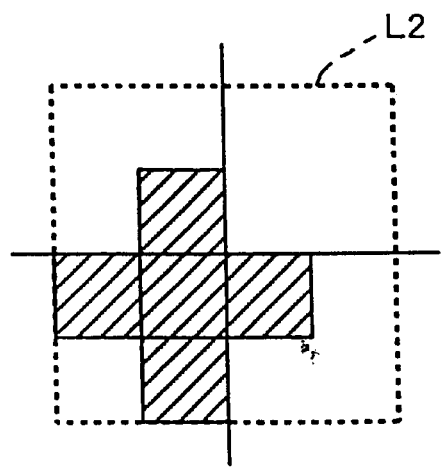
Figure 16D:
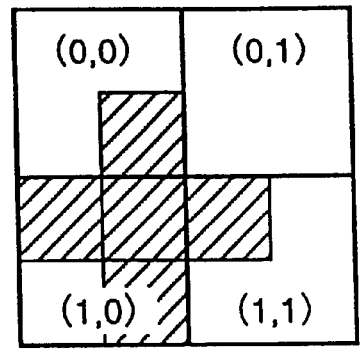

Accordingly, in this case, as shown in FIG. 16C, a virtual screen L2 with $2^{2i}$ units (i=2 herein) of display unit arrayed in a 4×4 matrix therein is set, this virtual screen L2 is divided, first area addresses are decided as shown in FIG. 16D, then the processing of the division is repeated n times thereafter and on until the number of display element 102 in a divided screen (namely an area) is one unit, and an n-th area address is added to the area, whereby, address information for each of the display elements 102 is decided by rows of bits obtained by finally arraying addresses in the order from the first area address to the n-th area address.

By setting the virtual screen as described above, it is possible to set address information for each display element 102 in the same method whatever a size or a shape the screen of the extending type of display apparatus 400 may have.

As described above, with an extending type of display apparatus according to the present invention, the screen can be extended by connecting a plurality of display units each having the same configuration to each other; the display unit comprises a plurality of display elements arrayed in a matrix, a controller for controlling each display state of each of the plurality of display elements, a storing section for storing therein each address information for each of the display elements in the screen, a signal transmitting section for signal transaction between the controller and an external device or any other display units, and a power transmitting section for supplying power to the plurality of display elements, controller, storing section, and the signal transmitting section; the power transmitting section can electrically be connected, when a plurality of display units are connected to each other, to power transmitting sections of any display units adjacent to the power transmitting section; the signal transmitting section can execute, when a plurality of display units are connected to each other, signal transaction with signal transmitting sections of any display units adjacent to the signal transmitting section; and each controller for each of the plurality of display units executes, when a plurality of display units are connected to each other, signal transaction with controllers of any other display units adjacent to the controller through the signal transmitting section, recognizes a size of the screen obtained by connecting a plurality of the display units to each other as well as a position of the unit in the screen, and generates each address information for each display element in the screen according to the position of the unit to be stored in the storing section, so that a user can freely and easily change a size of the screen, and the resolution can be increased or decreased according to the size thereof.

With an extending type of display apparatus according to the present invention, each controller for each of the plurality of display units determines, when having received a display signal including display address information specifying the display element as well as display data information indicating display contents from an external device or from any other display units adjacent to the controller, whether any address information matching with the display address information exists or not by referring to the storing section of the unit, and changes, if it is determined that the matching address information exists therein, the display state of any display element having the corresponding address information according to the display data information, so that the resolution can be increased or decreased according to the size of the screen.

With an extending type of display apparatus according to the present invention, each address information for each display element in the screen is obtained by first dividing the screen into four areas, adding thereto each of first area addresses with two bits of "00", "01", "10", "11" each correlating to each position of the divided screens, then, further dividing the 1/4 screen specified by one of the first area addresses into four areas, adding thereto each of second area addresses with two bits of "00", "01", "10", "11" each correlating to each position of the divided V screens, and then further dividing the 1/16 screen specified by one of the second area addresses into four areas, adding thereto each of third area addresses with two bits of "00", "01", "10", "11" each correlating to each position of the divided screens, repeating the processing for dividing the screen n-times thereafter and on so that the number of display elements in the divided screen will be one unit therein, and adding thereto the obtained n-th area address, and each of the address information obtained as described above is indicated by rows of bits arrayed in the order from the first area address to the n-th area address, so that one and the same extending type of display apparatus can deal with image data having various resolution. Also any transmitted image data can be displayed regardless of the size of a screen.

With an extending type of display apparatus according to the present invention, the signal transmitting section is an infrared communicating unit, so that a screen can easily be made up without requiring any connection of a signal line thereto or the like.

With an extending type of display apparatus according to the present invention, a power transmitting section in any one of display unit among a plurality of display units connected to each other is connected to an external power supply unit, and power is supplied to any other display units through the display unit connected to the external power supply unit, so that a screen can easily be made up without requiring any connection of a power line thereto or the like.

With an extending type of display apparatus according to the present invention, when a size of the screen obtained by connecting a plurality of the display units to each other and a position of the unit in the screen are to be recognized, the controller of any display unit connected to the external power supply unit instructs a start of processing for the recognition, so that preparation of address information can automatically be started.

With an extending type of display apparatus according to the present invention, each controller for each of the plurality of display units gives a request, when there is found any change in a connection state of any display units adjacent to the controller, of starting the processing for the recognition to any other display units, so that the address information can be updated as necessary.

With an extending type of display apparatus according to the present invention, each controller for each of the plurality of display units executes signal transaction with controllers of any other display units adjacent to the controller, determines how many display units are present in the right side, left side, upper side, and lower side from the unit respectively, and recognizes a size of the screen obtained by connecting a plurality of display units to each other and a position of the unit in the screen, so that a size of the screen and a position of the unit therein can efficiently be recognized.

With an extending type of display apparatus according to the present invention, the display unit has $2^{2m}$ units (m: an integer) of display element arrayed in a (2 m)×(2 m) matrix, so that the address information can easily be set.

With a display system using the extending type of display apparatus according to the present invention, a power supply unit for supplying power to the extending type of display apparatus, and a control unit for supplying a display signal including display address information and display data information indicating display contents to the extending type of display apparatus, so that it is possible to provide a display system using the extending type of display apparatus of which a size of the screen can freely and easily be changed by a user and the resolution can be increased or decreased according to the size thereof, and on which transmitted image data can be displayed whatever the size of the screen may be.

With a display system using the extending type of display apparatus, the system comprises an extending type of display apparatus of which the screen can be extended by connecting a plurality of display units each having the same configuration to each other; a power supply unit for supplying power to the extending type of display apparatus; and a control unit for supplying a display signal including display address information and display data information indicating display contents to the extending type of display apparatus, each display unit for each of the extending type of display apparatus comprises a plurality of display elements arrayed in a matrix; a controller for controlling each display state of the plurality of display elements; a storing section for storing therein each address information for each of the display elements in the screen; a signal transmitting section for signal transaction between the controller and the control unit or any other display units; and a power transmitting section for supplying power to the plurality of display elements, controller, storing section, and the signal transmitting section, the control unit comprises a determining means for receiving, from each display unit for the extending type of display apparatus, each connection state of any display units adjacent to the display unit and determining a size and a shape of the entire screen of the extending type of display apparatus; and an address information setting means for generating each address information for a display element of each of the display units and setting the address information in the storing section of the corresponding display unit, and the control unit stores, when the extending type of display apparatus and the control unit are connected to each other, each address information for each display element of the extending type of display apparatus in corresponding each storing section, so that it is possible to provide a display system using the extending type of display apparatus of which a size of the screen can freely and easily be changed by a user and the resolution can be increased or decreased according to the size thereof, and on which transmitted image data can be displayed whatever the size of the screen may be.

This application is based on Japanese patent application No. HEI 9-144296 filed in the Japanese Patent Office on Jun. 2, 1997, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An extending type of display apparatus having a screen that can be extended by connecting a plurality of display units, each display unit having the same configuration, to each other, wherein:

said each display unit comprises a plurality of display elements arrayed in a matrix, a controller for controlling each display state of each of said plurality of display elements, a storing section for storing therein each address information for each of the display elements, a signal transmitting section for signal transaction between said controller and an external device or any other display units, and a power transmitting section for supplying power to said plurality of display elements, controller, storing section, and said signal transmitting section;

said power transmitting section can electrically be connected, when said plurality of display units are connected to each other, to power transmitting sections of those of said plurality of display units adjacent to said power transmitting section;

said signal transmitting section can execute, when said plurality of display units are connected to each other, signal transaction with signal transmitting sections of those of said plurality of display units adjacent to said signal transmitting section; and said controller executes, when said plurality of display units are connected to each other, signal transaction with controllers of any other display units adjacent to said controller through said signal transmitting section, recognizes a size of the screen obtained by connecting said plurality of display units to each other and recognizes a position of the controller's display unit in said screen, and generates address information for each display element in said screen according to said position of the controller's display unit;

wherein said controller address information generating function comprises dividing the screen into equal portions and assigning first area addresses, then further repeating the division a plurality of times until the number of display elements in a divided screen is one unit.

2. An extending type of display apparatus according to claim 1 wherein said signal transmitting section is an infrared communicating means.

3. An extending type of display apparatus according to claim 1, further comprising a power transmitting section in any among the plurality of display units connected to each other, said power transmitting section being connected to an external power supply unit, whereby power is supplied to any other of said plurality of display units through the display unit connected to said external power supply unit.

4. An extending type of display apparatus according to claim 1 wherein said controller for each of said plurality of display units determines how many display units are present to the right side, left side, upper side, and lower side from the controller's display unit, respectively, for said recognizing a size of the screen.

5. An extending type of display apparatus according to claim 1 wherein said display unit has $2^{2m}$ (m: an integer) display elements arrayed in a (2 m)×(2 m) matrix.

6. A display system comprising an extending type of display apparatus according to claim 1, a power supply unit for supplying power to said extending type of display apparatus, and a control unit for supplying a display signal, including display address infonnation and display data information indicating display contents, to said extending type of display apparatus.

7. An extending type of display apparatus according to claim 1 wherein said controller sets a virtual screen with $2^{2I}$ (I=natural number) of display units arrayed in a 2i×2i matrix, divides the virtual screen into equal portions and assigns first area addresses, then further repeats the division n times until the number of display elements in a divided screen is one unit.

8. An extending type of display apparatus according to claim 1 wherein said screen comprises a virtual screen.

9. An extending type of display apparatus having a screen that can be extended by connecting a plurality of display units, each display unit having the same configuration, to each other, wherein:

said each display unit comprises a plurality of display elements arrayed in a matrix, a controller for controlling each display state of each of said plurality of display elements, a storing section for storing therein each address information for each of the display elements, a signal transmitting section for signal transaction between said controller and an external device or any other display units, and a power transmitting section for supplying power to said plurality of display elements, controller, storing section, and said signal transmitting section;

said power transmitting section can electrically be connected, when said plurality of display units are connected to each other, to power transmitting sections of those of said plurality of display units adjacent to said power transmitting section;

said signal transmitting section can execute, when said plurality of display units are connected to each other, signal transaction with signal transmitting sections of those of said plurality of display units adjacent to said signal transmitting section;

said controller executes, when said plurality of display units are connected to each other, signal transaction with controllers of any other display units adjacent to said controller through said signal transmitting section, recognizes a size of the screen obtained by connecting said plurality of display units to each other and recognizes a position of the controller's display unit in said screen, and generates address information for each display element in said screen according to said position of the controller's display unit;

wherein said controller address information generating function comprises dividing the screen into equal portions and assigning first area addresses, then further repeating the division a plurality of times until the number of display elements in a divided screen is one unit; and said controller for each of said plurality of display units determines, when having received a display signal including display address information specifying a display element as well as display data information, from an external device or from any other display units adjacent to said controller, whether any address information matching said display address information exists or not by referring to said storing section of the controller's display unit, and changes, if it is determined that the matching address information exists therein, a display state of any display element having the corresponding address information, according to said display data information.

10. An extending type of display apparatus having a screen that can be extended by connecting a plurality of display units, each display unit having the same configuration, to each other, wherein:

said each display unit comprises a plurality of display elements arrayed in a matrix, a controller for controlling each display state of each of said plurality of display elements, a storing section for storing therein each address information for each of the display elements, a signal transmitting section for signal transaction between said controller and an external device or any other display units, and a power transmitting section for supplying power to said plurality of display elements, controller, storing section, and said signal transmitting section;

said power transmitting section can electrically be connected, when said plurality of display units are connected to each other, to power transmitting sections of those of said plurality of display units adjacent to said power transmitting section;

said signal transmitting section can execute, when said plurality of display units are connected to each other, signal transaction with signal transmitting sections of those of said plurality of display units adjacent to said signal transmitting section;

said controller executes, when said plurality of display units are connected to each other, signal transaction with controllers of any other display units adjacent to said controller through said signal transmitting section, recognizes a size of the screen obtained by connecting said plurality of display units to each other and recognizes a position of the controller's display unit in said screen, and generates address information for each display element in said screen according to said position of the controller's display unit;

wherein said controller address information generating function comprises dividing the screen into eiual portions and assigning first area addresses, then further repeating the division a plurality of times until the number of display elements in a divided screen is one unit;

a power transmitting section in any among the plurality of display units connected to each other, said power transmitting section being connected to an external power supply unit, whereby power is supplied to any other of said plurality of display units through the display unit connected to said external power supply unit; and when a size of the screen, obtained by connecting a plurality of said display units to each other, and a position of the unit in said screen are to be recognized, the controller of any display unit connected to said external power supply unit instructs start of processing for said recognition.

11. An extending type of display apparatus having a screen that can be extended by connecting a plurality of display units, each display unit having the same configuration, to each other, wherein:

said each display unit comprises a plurality of display elements arrayed in a matrix, a controller for controlling each display state of each of said plurality of display elements, a storing section for storing therein each address information for each of the display elements, a signal transmitting section for signal transaction between said controller and an external device or any other display units, and a power transmitting section for supplying power to said plurality of display elements, controller, storing section, and said signal transmitting section;

said power transmitting section can electrically be connected, when said plurality of display units are connected to each other, to power transmitting sections of those of said plurality of display units adjacent to said power transmitting section;

said signal transmitting section can execute, when said plurality of display units are connected to each other, signal transaction with signal transmitting sections of those of said plurality of display units adjacent to said signal transmitting section;

said controller executes, when said plurality of display units are connected to each other, signal transaction with controllers of any other display units adjacent to said controller through said signal transmitting section, recognizes a size of the screen obtained by connecting said plurality of display units to each other and recognizes a position of the controller's display unit in said screen, and generates address information for each display element in said screen according to said position of the controller's display unit;

wherein said controller address information generating function comprises dividing the screen into eiual portions and assigning first area addresses, then further repeating the division a plurality of times until the number of display elements in a divided screen is one unit; and said controller for each of said plurality of display units transmits a request, when there is found any change in a connection state of any display units adjacent to said controller, for starting the processing for said recognition to any other of said plurality of display units.

12. An extending type of display apparatus having a screen that can be extended by connecting a plurality of display units, each display unit having the same configuration, to each other, wherein:

said each display unit comprises a plurality of display elements arrayed in a matrix, a controller for controlling each display state of each of said plurality of display elements, a storing section for storing therein each address information for each of the display elements, a signal transmitting section for sianal transaction between said controller and an external device or any other display units, and a power transmitting section for supplying power to said plurality of display elements, controller, storing section, and said signal transmitting section;

said power transmitting section can electrically be connected, when said plurality of display units are connected to each other, to power transmitting sections of those of said plurality of display units adjacent to said power transmitting section;

said signal transmitting section can execute, when said plurality of display units are connected to each other, signal transaction with signal transmitting sections of those of said plurality of display units adjacent to said signal transmitting section;

said controller executes, when said plurality of display units are connected to each other, signal transaction with controllers of any other display units adjacent to said controller through said signal transmitting section, recognizes a size of the screen obtained by connecting said plurality of display units to each other and recognizes a position of the controller's display unit in said screen, and generates address information for each display element in said screen according to said position of the controller's display unit;

wherein said controller address information generating function comprises dividing the screen into equal portions and assigning first area addresses, then further repeating the division a plurality of times until the number of display elements in a divided screen is one unit; and said screen comprises in a first level an overall structure formed of a plurality of display units, each said display unit comprises in a second level, a sub structure formed of a plurality of display elements, and each said display elements in a third level are a lowest level display component.

* * * * *